Figure 5:
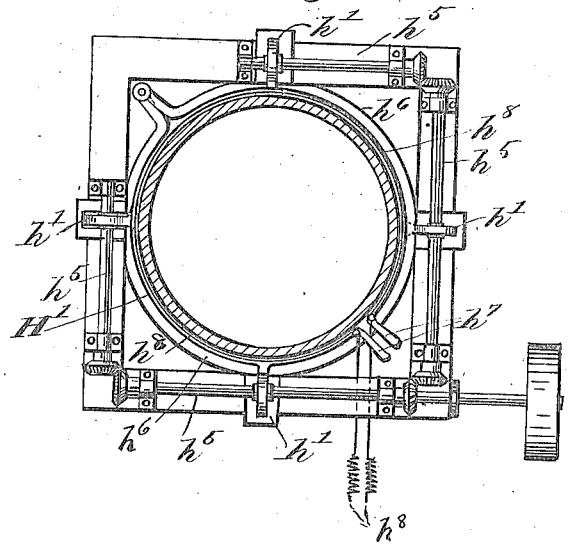

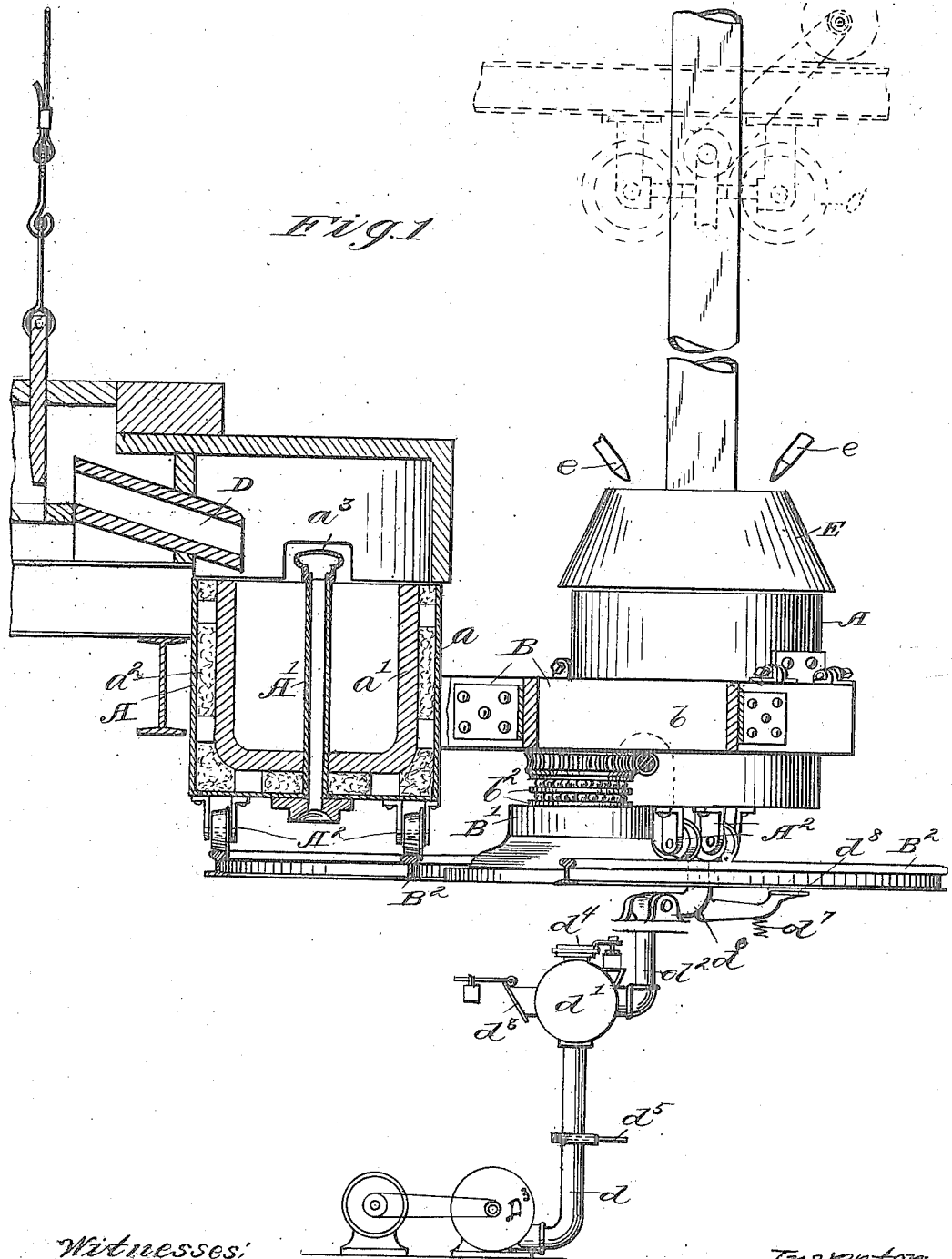

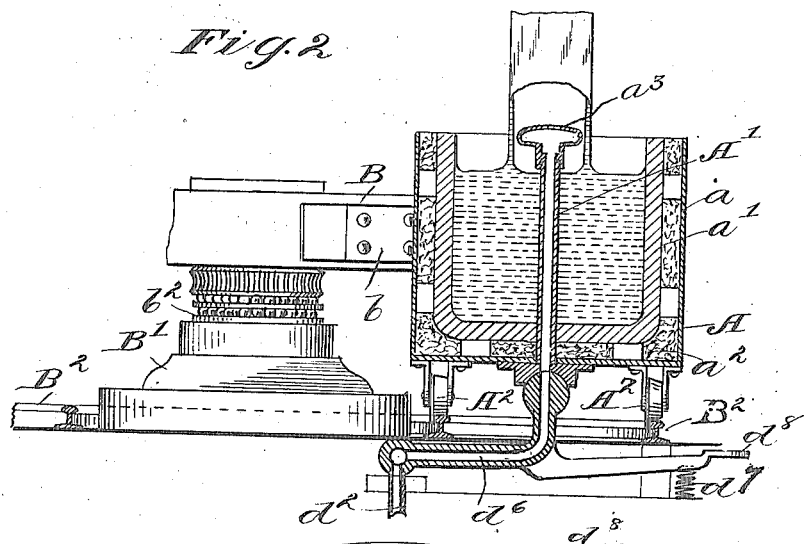
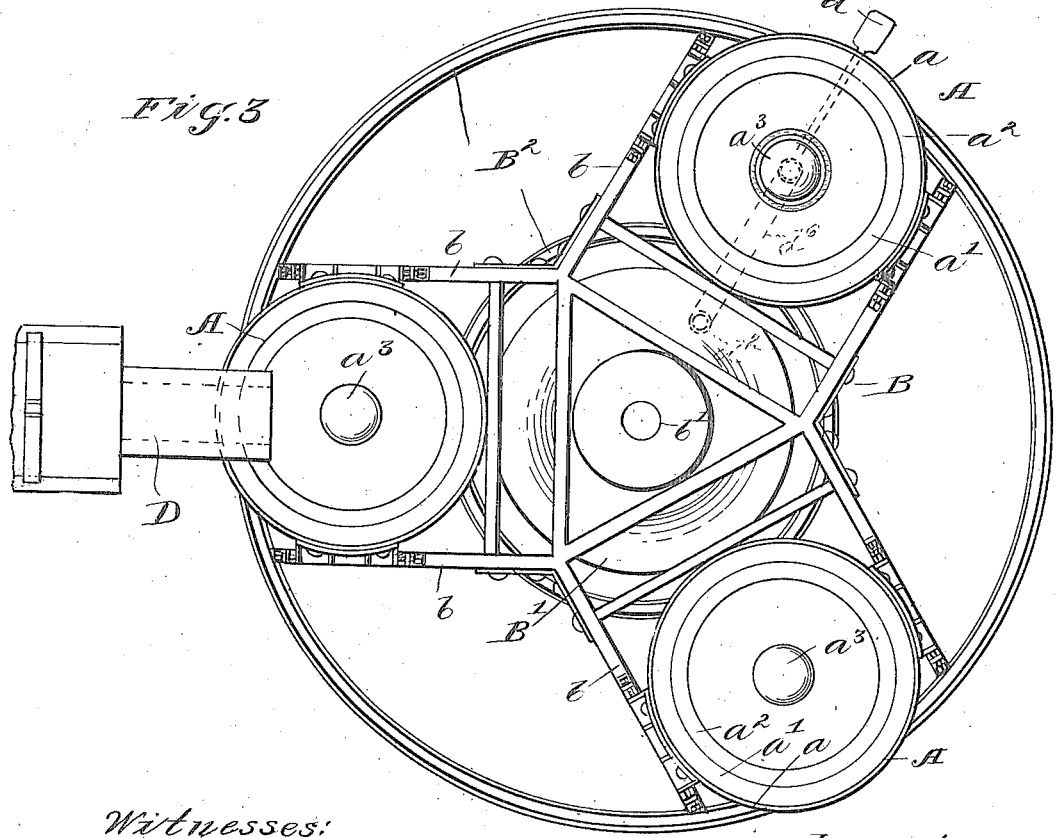

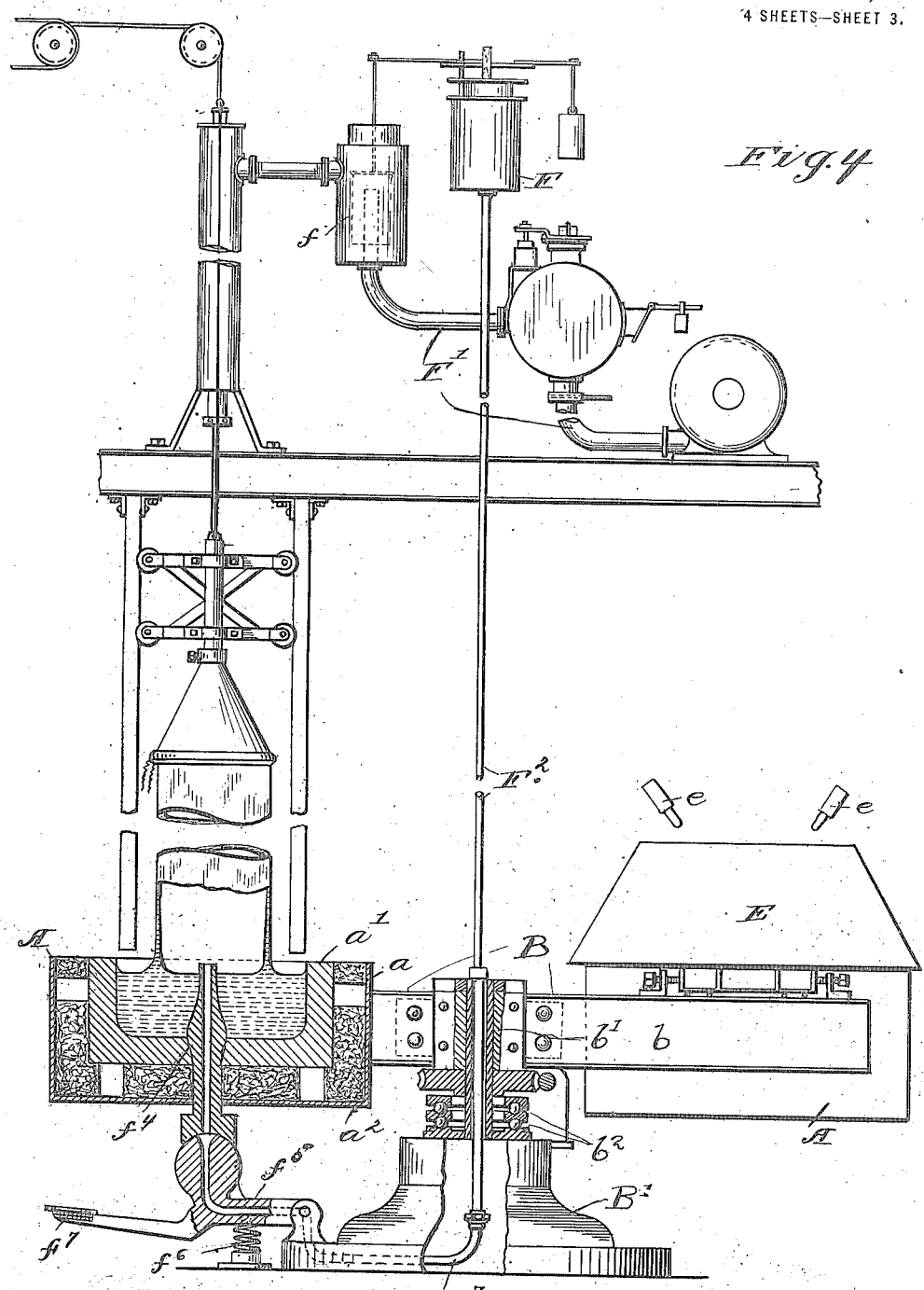

R. L. FRINK.
GLASS DRAWING MECHANISM.
APPLICATION FILED MAR. 25, 1909.

1,166,125.

Patented Dec. 28, 1915.
4 SHEETS—SHEET 4.

Witnesses:

Inventor:
Robert L. Frink
by
J. B. Fay
Attorney.

UNITED STATES PATENT OFFICE.

ROBERT L. FRINK, OF CLEVELAND, OHIO.

GLASS-DRAWING MECHANISM.

1,166,125.	Specification of Letters Patent.	Patented Dec. 28, 1915.

Application filed March 25, 1909. Serial No. 485,677.

*To all whom it may concern:*

Be it known that I, ROBERT L. FRINK, a citizen of the United States, and a resident of Cleveland, county of Cuyahoga, and State of Ohio, have invented a new and useful Improvement in Glass-Drawing Mechanism, of which the following is a specification, the principle of the invention being herein explained and the best mode in which I have contemplated applying that principle, so as to distinguish it from other inventions.

The object of the present invention is primarily the provision of suitable apparatus adapted to utilize the method of drawing glass set forth in my issued Patent No. 846,102, dated March 5th, 1907, with rotatable drawing pots. Incidentally the means thus provided are by slight modification adapted for use in an improvement in such method set forth in a co-pending application filed November 27, 1908, No. 464,654, both such processes being characterized by having fluid pressure connections to the interior of the cylinder through the bottom of the drawing pot. An improvement is likewise contemplated in the construction of the mechanism whereby the raising of the cylinder may be facilitated and the drawing operation rendered more certain and steady.

With the accomplishment of the foregoing and related objects in view, said invention consists of the means hereinafter fully described and particularly pointed out in claims.

The annexed drawings and the following description set forth in detail certain mechanism embodying the invention, such disclosed means constituting, however, but several of the various mechanical forms in which the principle of the invention may be used.

Figure 6:
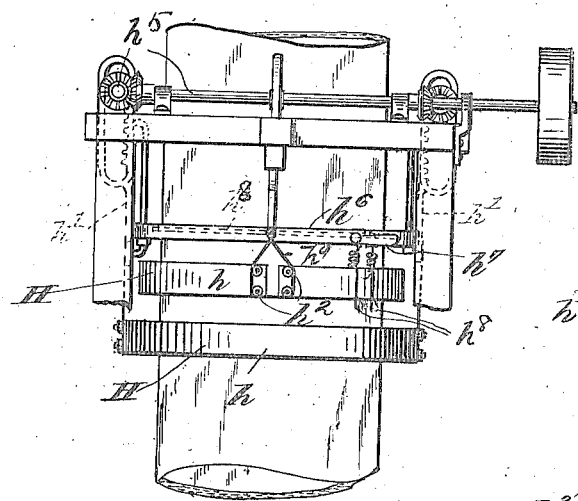
Figure 7:
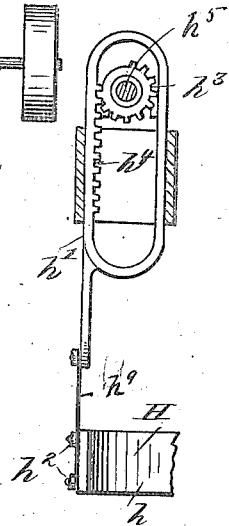

In said annexed drawings: Figure 1 is a partial side elevation and partial section of a continuous cylinder drawing plant wherein have been incorporated the several improvements constituting my present invention; Fig. 2 is a sectional view of a portion of the apparatus of such plant taken on a different plane from that of Fig. 1; Fig. 3 is a plan view of the apparatus; Fig. 4 illustrates, partially in side elevation and partly in section, the adaptation of such present invention to the improved structure of the co-pending application referred to; Figs. 5 and 6 respectively illustrate in plan and side elevation the improved construction of drawing mechanism above referred to, and Fig. 7 is a detached view of one of the raising and lowering devices for the gripper band.

The construction of rotatable drawing pot, shown in two slightly different forms in connection with the apparatus of Figs. 1, 2 and 3 and that of Fig. 4, is not presented as a part of the present invention, being fully set forth in another co-pending application filed February 17, 1908, Serial No. 416,230. As a matter of fact there are three such drawing pots A provided in connection with such first apparatus, these pots being carried in the outer ends of the radiating arms $b$ of a frame B rotatably mounted upon a suitable pedestal B'. The latter is provided with an upwardly projecting stud or shaft $b'$ surrounded with a ball thrust-bearing $b^2$, which shaft forms the axis of the frame. The arms of the frame in its approved form comprise simply two parallel beams or channels between which the drawing pots proper are held. Each of the latter, as will be evident from an inspection of the several views of the same, consists of an exterior metal jacket $a$ within which, and spaced therefrom, is supported a vessel $a'$ of clay or other suitable refractory material wherein the molten glass is designed to be retained. In the space intervening between vessel $a'$ and jacket $a$, is provided a layer $a^2$ of mineral wool, asbestos or like material, which serves to thoroughly insulate the vessel from the chilling influence of the atmosphere. Centrally mounted in each pot is a tubular support or duct A' that bears at its upper end the drawing head $a^3$, characteristic of apparatus employed in carrying out my improved method of drawing glass. This method consists, briefly stated, in passing the cylinder, or "roller," being drawn, between rollers C located above the drawing station and rotating in proper direction to draw such cylinder upwardly around drawing head $a^3$ once it has been started. The latter, acting in conjunction with an air supply that is furnished therethrough, automatically regulates the diameter of the cylinder thus drawn, the length of the cylinder being limited only by the quantity of glass available in the pot. Heretofore such pot has been shown as stationary with suitable passages or ways connecting the same with an adjacent glass melting furnace from which metal could be continuously supplied to take the place of that removed from the pot as the drawing of the cylinder progressed. As compared with such stationary type of pot, a movable one possesses various advantages, that, inasmuch as they are well understood in the art, need not be recounted here. It is to avail myself of these advantages, while still utilizing the method of drawing cylinders just described, that the present apparatus has been devised. The frame B, accordingly, that has been seen to support the three pots A, is designed to be rotated so as to successively bring each of said pots beneath the discharge end of a passage or conduit D, whereby molten glass may be directly supplied thereto from the furnace; then to bring such pot in proper alinement with the drawing apparatus at the drawing station; and finally, in an intermediate position between the two just referred to, to bring such pot in operative relation to suitable means for melting down the accumulation of congealed metal or glass within the pot, which it is desirable should be reduced to a liquid state before proceeding with the admission of a fresh charge of metal, and the subsequent drawing of the latter into another cylinder.

The character of the drawing mechanism, as also that of the means provided for supplying molten glass to the apparatus, has already been sufficiently indicated; for melting down the congealed glass in the pot when in its third position, a hood E is provided beneath which it is adapted to be then located. With this hood are connected suitable heating means in the form of burners e or the like, whereby the interior of the vessel may be heated, and the accumulation of solidified glass may be melted down preparatory to filling the vessel with a fresh supply of metal. There being three vessels or drawing pots equidistantly disposed about the axis of the frame, it will be obvious that one of the same is at all times positioned in operative relation to the supply passage D, the drawing mechanism C and such melting hood E, so that the general operation is continuous save for the slight interruption incidental to the shifting of a freshly filled pot around to the drawing station to take the place of one that has just been emptied.

The drawing pots are desirably made of a considerably larger capacity than has heretofore prevailed, when such pots have been rotatably mounted in a fashion analogous to that just described. I accordingly provide a circular track or way B² concentric with respect to the axis of frame B, and mount said pots upon trucks A², so that the burden of their weight is supported on said track, and the frame correspondingly relieved. The function of the latter in fact, becomes simply that of rotating the apparatus, suitable driving mechanism being provided for effecting such rotation, as will be readily understood.

The tubular member A', which it has been seen rises centrally within each pot to support the drawing head a³, terminates a short distance below the bottom of said pot so as to leave the latter free to be moved around upon the track or way B², in the fashion just described. In two positions of the pot, namely when filled with glass from the tank and when being melted down after the drawing operation, the head is not in use, but in connection with the drawing operation, it is necessary that air be supplied thereto in order to properly maintain the diameter of the cylinder, in accordance with the method already referred to. I accordingly provide separable air supply connections for said tubular support adapted to be connected therewith when the pot is located in operative position below the drawing mechanism. Details of the supply mechanism proper need not be noted further than to remark that they consist of a supply duct or pipe d, a drum d' laterally connected with such supply pipe, and a blower D³ having its delivery pipe d extending through said drum and opening laterally into the same. Weighted escape valves d³ d⁴ are provided for the upper end of the blower delivery pipe and for an opening in the drum d' located in its side substantially opposite the supply pipe d. The aperture in the latter is regulated by a slide, or gate, valve d⁵. This air supply mechanism likewise, is not presented as a part of the present invention, being fully set up and claimed in my pending application filed July 24, 1908, Serial No. 445,077, the function of such mechanism being to supply a substantially constant volume of air to the portion of the cylinder lying between the level of glass in the pot A and the drawing head a³ upon the upper end of the tubular support A'. For effecting connection between this supply mechanism and successive pots of the series borne by frame B, a pipe section d⁶ is connected with the outer end of the supply pipe, such section being pivotally mounted and being upturned at its upper end, so that, when raised, it is adapted to contact with the lower end of the tubular drawing head support, which projects downwardly through the bottom of the pot. Resilient means, as a compression spring d⁷, serve to make and retain this connection a secure one, while a pedal d⁸ affords convenient means for the operator in charge to break such connection whenever it becomes desirable to do so, as upon the shifting of the apparatus to bring another pot into the position for drawing.

The apparatus illustrated in Fig. 4, aside from the fact that it includes but two drawing pots A (into which the glass is intended to be supplied by ladling), is further differentiated from the apparatus thus far discussed, by supplying the air, utilized in maintaining the diameter or distending the cylinder, from above. The drawing operation being of the discontinuous character, necessarily involved in the handling of a limited quantity of glass, a single cylinder or roller of relatively short length is produced by each operation. A further distinction consists in the use of a valve $f$, automatically operated by manometric means F, connected with a pipe or duct F', that leads to the cylinder portion to which the air is being supplied. The supply mechanism, proper, does not differ from that previously described, other than that a valve $f$ of the liquid seal type is substituted for the slide valve $d$ in order that operation thereof may be as frictionless as possible.

For operating the manometer a duct $F^2$ requires to be passed upwardly through the bottom of the drawing pot so as to extend above the level of the glass in such pot, and thus transmit fluctuations in the pressure within the cylinder to the manometer. In order to permit of the movement of the pots, supported in the manner previously described, the connection between the main portion $f^3$ of such duct and the portion $f^4$ thus seen to extend upwardly through the bottom of the pot is made a separable one. A pivotally mounted pipe section $f^5$ is then utilized as before, such section having an upturned end adapted in raised position to contact with the lower end of the duct portion $f^4$ carried by the pot. Resilient means $f^6$ serve to make and retain this connection a secure one, while a pedal $f^7$ affords convenient means for the operator in charge to break the connection, when it is desired to shift the apparatus to bring another pot into the drawing position.

The drawing mechanism illustrated in Figs. 5 and 6 is intended for use in the continuous or semi-continuous drawing operation characterizing the general apparatus first described above; in other words, it may be substituted, if found desirable, for the rolls of such apparatus. Briefly described, this substitute drawing mechanism consists of a pair of alternately operative gripping devices H, each made up of two or more bands $h$ conforming to the curve of the cylinder but not quite equal, in their combined extent, to the circumference of such cylinder. Each set of gripping bands is adapted to be raised and lowered by means of vertically reciprocable members $h'$ having their lower ends connected with said bands by means of stout cords $h^9$, or like flexible connections, passing around buttons or rollers $h^2$ mounted near the contiguous edges of said bands so as to tend to draw the latter together whenever any pulling strain is imparted to said connections. Members $h'$ are given their reciprocatory movement by means of mutilated pinions $h^3$ that mesh with racks $h^4$ wherewith said members are provided. By means of suitably intergeared shafts $h^5$ provision is made to rotate the mutilated pinion so that the pairs of members rise and fall alternately, one pair being timed to rise while the other falls. Since the falling movement is much the more rapid, it will be evident that a continuous pull may be excited upon the cylinder without hitch or let up in drawing operation. Moreover, the effect of the slight momentum acquired by the bands in their fall serves to cause them to grip the cylinder at once, and that quite tightly, upon the limit of their downward movement being reached. I have also taken occasion to illustrate in Figs. 5 and 6 an improved construction of "capper," or cylinder severing device H', that, while particularly adapted for use in connection with the foregoing drawing device, is not necessarily thus limited in its use. Such "capper" comprises simply two curved arms $h^6$, suitably supported upon one of the reciprocable members $h'$ and provided with handles $h^7$, whereby their free ends may be brought together. Such members are not designed, when thus closed around the cylinder, to contact therewith, but a loop $h^8$ of wire, or like conductor, carried by the arms, is adjusted so as to close in upon such cylinder. This loop being a part of an electric circuit, a current may be passed therethrough until a sufficient temperature is developed to cause the glass to crack, thus severing from the body of the cylinder the portion lying above the plane of the "capper." Such severed section may be removed in any desired fashion; mechanism for this purpose, however, is not illustrated.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the class described, the combination of cylinder-drawing apparatus; a movable support; a plurality of pots carried by said support and adapted to be successively brought into operative position with respect to said drawing apparatus, each of said pots being provided with a duct rising upwardly so as to extend within a cylinder being drawn from said pot; and an air-supply pipe adapted to be detachably connected with the respective ducts in said pots as the latter are successively moved into such operative position.

2. In mechanism of the class described, the combination of cylinder-drawing apparatus; a rotatable support; a plurality of pots carried by said support and adapted to be successively brought into operative position beneath said drawing apparatus, each of said pots being provided with a duct rising upwardly so as to extend within a cylinder being drawn from said pot; and an air-supply pipe adapted to be detachably connected with the respective ducts in said pots as the latter are successively moved into such operative position.

3. In mechanism of the class described, the combination of cylinder-drawing apparatus; a movable support; a plurality of pots carried by said support and adapted to be successively brought into operative position with respect to said drawing apparatus, each of said pots being provided with a duct rising upwardly so as to extend within a cylinder being drawn from said pot; and an air-supply pipe adapted to be detachably connected with the respective ducts in said pots as the latter are successively moved into such operative position, said air-supply pipe and ducts being formed with complementary convex and concave engaging faces adapted to automatically locate the corresponding pot in drawing position.

4. In mechanism of the class described, the combination of cylinder-drawing apparatus; a rotatable support; a plurality of pots carried by said support and adapted to be successively brought into operative position beneath said drawing apparatus, each of said pots being provided with a duct rising upwardly so as to extend within a cylinder being drawn from said pot; and an air-supply pipe adapted to be detachably connected with the respective ducts in said pots as the latter are successively moved into such operative position, said air-supply pipe being formed with a convex face and each of said ducts with a complementary concave face adapted to engage with the face of said air-supply pipe to automatically locate the corresponding pot in drawing position.

5. In mechanism of the class described, the combination of cylinder-drawing apparatus; a movable support; a plurality of pots carried by said support and adapted to be successively brought into operative position with respect to said drawing apparatus, each of said pots being provided with a duct rising upwardly so as to extend within a cylinder being drawn from said pot; and an air-supply pipe adapted to be detachably connected with the respective ducts in said pots as the latter are successively moved into such operative position, said air-supply pipe and ducts being relatively movable in a direction transverse of the plane of movement of said pots.

6. In mechanism of the class described, the combination of cylinder-drawing apparatus; a movable support; a plurality of pots carried by said support and adapted to be successively brought into operative position with respect to said drawing apparatus, each of said pots being provided with a duct rising upwardly so as to extend within a cylinder being drawn from said pot; an air-supply pipe adapted to be detachably connected with the respective ducts in said pots as the latter are successively moved into such operative position, said air-supply pipe and ducts being relatively movable in a direction transverse of the plane of movement of said pots; and resilient means tending to maintain said air-supply pipe and selected duct in connection with each other.

7. In mechanism of the class described, the combination of cylinder-drawing apparatus; a movable support; a plurality of pots carried by said support and adapted to be successively brought into operative position with respect to said drawing apparatus, each of said pots being provided with a duct rising upwardly so as to extend within a cylinder being drawn from said pot; and an air-supply pipe adapted to be detachably connected with the respective ducts in said pots as the latter are successively moved into such operative position, said air-supply pipe and ducts being relatively movable in a direction transverse of the plane of movement of said pots and having their engaging faces complementarily inclined.

8. In mechanism of the class described, the combination of cylinder-drawing apparatus; a movable support; a plurality of pots carried by said support and adapted to be successively brought into operative position with respect to said drawing apparatus, each of said pots being provided with a duct rising upwardly so as to extend within a cylinder being drawn from said pot; and an air-supply pipe adapted to be detachably connected with the respective ducts in said pots as the latter are successively moved into such operative position, said air-supply pipe and ducts being relatively movable in a direction transverse of the plane of movement of said pots and having their engaging faces of complementary convex and concave form.

9. In mechanism of the class described, the combination of cylinder-drawing apparatus; a movable support; a plurality of pots carried by said support and adapted to be successively brought into operative position with respect to said drawing apparatus, each of said pots being provided with a duct rising upwardly so as to extend within a cylinder being drawn from said pot; an air-supply pipe adapted to be detachably connected with the respective ducts in said pots as the latter are successively moved into such operative position, said air-supply pipe and ducts being relatively movable in a direction transverse of the plane of movement of said pots and having their engaging faces of complementary convex and concave form; and resilient means tending to maintain said air-supply pipe and selected duct in connection with each other.

10. In mechanism of the class described, the combination of cylinder-drawing apparatus; a movable support; a plurality of pots carried by said support and adapted to be successively brought into operative position with respect to said drawing apparatus, each of said pots being provided with a duct rising upwardly so as to extend within a cylinder being drawn from said pot; and a movable, resiliently supported air-supply pipe adapted to be detachably connected with the respective ducts in said pots as the latter are successively moved into such operative position.

11. In mechanism of the class described, the combination of cylinder-drawing apparatus; a rotatable support; a plurality of pots carried by said support and adapted to be successively brought into operative position beneath said drawing apparatus, each of said pots being provided with a duct rising upwardly so as to extend within a cylinder being drawn from said pot; a movable air-supply pipe adapted to be detachably connected with the respective ducts in said pots as the latter are successively moved into such operative position; and resilient means adapted to support said pipe thus in connection with a duct.

12. In mechanism of the class described, the combination of cylinder-drawing apparatus; a rotatable support; a plurality of pots carried by said support and adapted to be successively brought into operative position beneath said drawing apparatus, each of said pots being provided with a duct rising upwardly so as to extend within a cylinder being drawn from said pot; a movable air-supply pipe adapted to be detachably connected with the respective ducts in said pots as the latter are successively moved into such operative position; and resilient means tending to support said pipe with its upper end in a position above the plane of movement of the lower ends of said ducts, such upper end of said air-supply pipe and the lower ends of said ducts having complementary inclined engaging faces.

13. In mechanism of the class described, the combination of cylinder-drawing apparatus; a rotatable support; a plurality of pots carried by said support and adapted to be successively brought into operative position beneath said drawing apparatus, each of said pots being provided with a duct rising upwardly so as to extend within a cylinder being drawn from said pot; a movable air-supply pipe adapted to be detachably connected with the respective ducts in said pots as the latter are successively moved into such operative position; and resilient means tending to support said pipe with its upper end in a position above the plane of movement of the lower ends of said ducts, such upper end of said air-supply pipe and the lower ends of said ducts having complementary convex and concave engaging faces adapted to automatically locate the corresponding pot in drawing position.

14. In glass drawing mechanism, the combination with a conduit for supplying molten glass, drawing rolls, and downwardly directed heating means symmetrically disposed about a central point; of a support rotatable about an axis passing through such point; three pots borne by said support and adapted to be successively brought into operative relation with said conduit, rolls, and heating means upon rotation of said support; a central duct in each of said pots rising upwardly so as to extend within a cylinder being drawn from said pot; a drawing head surmounting each such duct; and a relatively fixed pressure-supply duct terminating adjacent to the drawing station and adapted to be connected with the duct borne by the pot there located.

15. In glass drawing mechanism, the combination with a conduit for supplying molten glass, drawing means, and heating means symmetrically disposed about a central point; of a support rotatable about an axis passing through such point; a plurality of pots borne by said support and adapted to be successively brought into operative relation with said conduit, drawing means, and heating means upon rotation of said support; a duct in each of said pots rising upwardly so as to extend within a cylinder being drawn from said pot; a relatively fixed exterior duct terminating adjacent to the drawing station; and a movable section forming the end of said exterior duct and adapted, in raised position, to connect the same with the duct borne by a pot located thereover.

16. In glass drawing mechanism, the combination with a conduit for supplying molten glass, drawing rolls, and downwardly directed heating means symmetrically disposed about a central point; of a support rotatable about an axis passing through such point; three pots borne by said support and adapted to be successively brought into operative relation with said conduit, rolls, and heating means upon rotation of said support; a central duct in each of said pots rising upwardly so as to extend within a cylinder being drawn from said pot; a drawing head surmounting each such duct;

a relatively fixed exterior pressure-supply duct terminating adjacent to the drawing station; and a pivotally mounted section forming the end of said exterior duct and adapted, in raised position to connect the same with the duct borne by a pot located thereover.

17. In glass drawing mechanism, the combination with a conduit for supplying molten glass, drawing rolls, and downwardly directed heating means symmetrically disposed about a central point; of a support rotatable about an axis passing through such point, three pots borne by said support and adapted to be successively brought into operative relation with said conduit, rolls, and heating means upon rotation of said support; a central duct in each of said pots rising upwardly so as to extend within a cylinder being drawn from said pot; a drawing head surmounting each such duct; a relatively fixed exterior pressure-supply duct terminating adjacent to the drawing station; a pivotally mounted section forming the end of said exterior duct and adapted, in raised position, to connect the same with the duct borne by a pot located thereover; and resilient means normally thus raising said duct section.

Signed by me this 6th day of March, 1909.

ROBERT L. FRINK.

Attested by—
 CHRISTINE E. AINS,
 JNO. F. OBERLIN.